Figure 1:
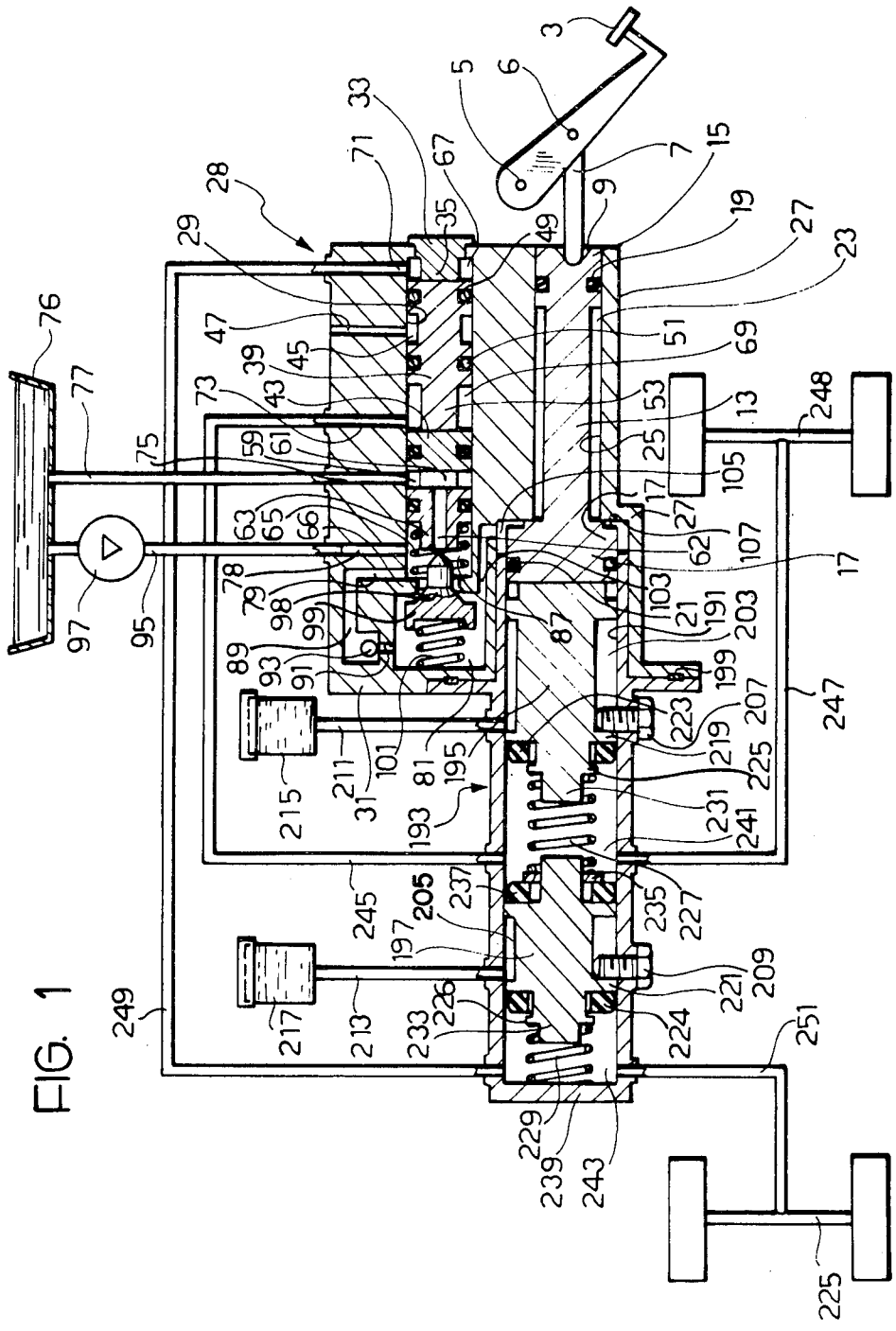

United States Patent [19]

Bertone et al.

[11] 4,123,908
[45] Nov. 7, 1978

[54] HYDRAULIC SERVO ASSISTED BRAKING SYSTEM

[75] Inventors: Antonino Bertone, Sant'Antonino (Vercelli); Enrico Rivetti, Turin, both of Italy

[73] Assignee: FIAT Societa per Azioni, Turin, Italy

[21] Appl. No.: 740,463

[22] Filed: Nov. 10, 1976

[30] Foreign Application Priority Data

Nov. 12, 1975 [IT] Italy .................. 69786 A/75

[51] Int. Cl.² ............................................. B60T 13/12
[52] U.S. Cl. ........................................ 60/548; 60/555; 60/562; 91/460
[58] Field of Search ............... 60/548, 555, 562, 579, 60/581, 585, 592, 593, 552, 547; 91/460

[56] References Cited

U.S. PATENT DOCUMENTS

| | | | |
|---|---|---|---|
| 2,945,352 | 7/1960 | Stelzer | 60/548 |
| 2,976,686 | 3/1961 | Stelzer | 60/555 |
| 3,064,431 | 11/1962 | Schnell | 60/548 |
| 3,638,427 | 2/1972 | Meyers | 60/548 |
| 3,729,931 | 5/1973 | Shilton | 60/555 |
| 3,797,246 | 3/1974 | Belart | 60/555 |
| 3,818,705 | 6/1974 | Thomas | 60/548 |
| 3,886,746 | 6/1975 | Farr | 60/547 |
| 3,978,670 | 9/1976 | Kruse | 60/562 |
| 4,028,891 | 6/1977 | Belart | 60/562 |

Primary Examiner—Martin P. Schwadron
Assistant Examiner—Abraham Hershkovitz
Attorney, Agent, or Firm—Sughrue, Rothwell, Mion, Zinn and Macpeak

[57] ABSTRACT

A servo-assisted hydrodynamic braking system of the type in which brake pedal pressure is used to control a modulating valve which restricts an output line of a pump thereby increasing the pressure in the output line which is connected to the master cylinder of the braking system in such a way as to apply this increased pressure as a servo-assisting pressure, in which the master cylinder and modulating valve are made as a composite assembly and the pressure within the master cylinder part is used to control the modulating valve so that no direct mechanical interconnection between the brake pedal and the modulating valve is needed.

5 Claims, 2 Drawing Figures

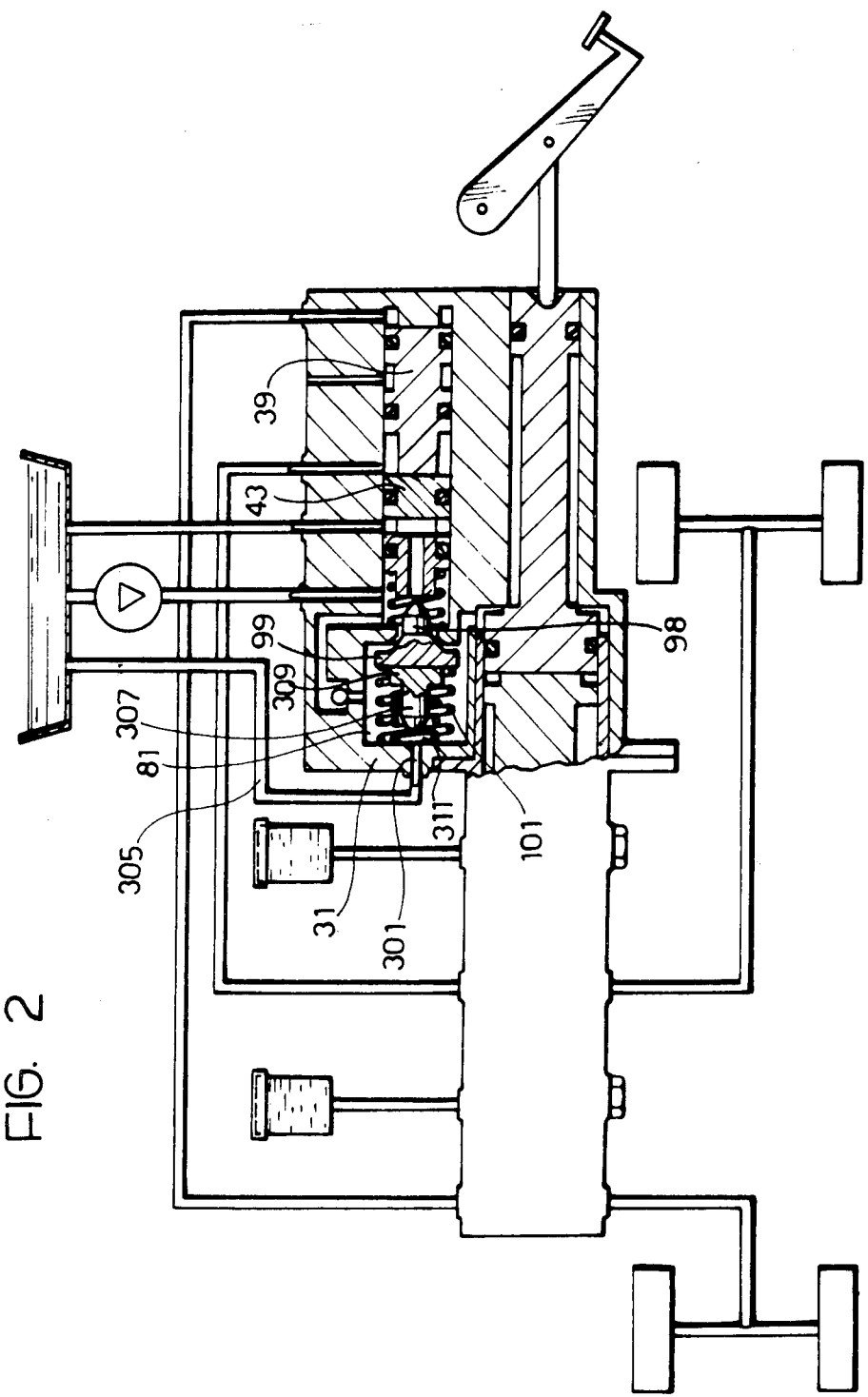

HYDRAULIC SERVO ASSISTED BRAKING SYSTEM

The present invention relates to a hydraulic braking system, and particularly to a hydrodynamic servo-assisted braking system.

Servo-assisted braking systems act to reduce the force which a driver has to exert upon the brake pedal in order to achieve a required braking pressure at the brake actuators. Servo-assisted braking systems may be of various types for both hydraulic and pneumatic braking systems.

One servo-assisted braking system is described in U.S. Pat. application No. 726,322 filed by the same Applicant. In this there is described a hydraulic braking system which includes a pressure modulating distribution device connected to a pressure generator in the form of a volumetric pump, and controlled by the brake pedal by means of a control rod. In this system pressure generated by the pump is selectively applied to the master cylinder of the braking system to reduce the pedal pressure required to achieve a desired braking pressure.

The present invention seeks to provide a hydraulic servo-assisted braking system which is simpler to manufacture and therefore more economical than known systems.

According to the present invention there is provided a servo-assisted hydrodynamic braking system for a motor vehicle, of the type comprising a master cylinder connected to a brake pedal, a pump for generating fluid pressure and a modulating valve controlled by the brake pedal to apply pressure generated by the pump as a servo-assisting pressure to the master cylinder, in which the modulating valve and master cylinder are formed as a single assembly adapted to apply pressure generated in the master cylinder to control the modulating valve.

Two embodiments of the present invention will now be more particularly described, by way of example, with reference to the accompanying drawings, in which:

FIG. 1 is a schematic partly sectioned view of a first embodiment of the invention; and FIG. 2 is a schematic partly sectioned view of a second embodiment of the invention.

Referring now to FIG. 1, there is shown a brake pedal 3 pivoted at one end about a pivot 5 and pivotally connected at an intermediate point by a pivot pin 6 to one end of a push rod 7 the other end of which engages in a recess 9 in a master cylinder piston 13. The master cylinder piston 13 has two enlarged ends 15 and 17 which are slidingly housed in respective coaxial bores 25, 191 in the master cylinder. The two coaxial bores 25, 191 have a radial shoulder where they meet, against which radial shoulder abuts the enlarged end 17 of the master cylinder piston 13 when the master cylinder is in the rest or inoperative position. Housed in annular grooves in the two enlarged ends 15, 17 of the master cylinder piston 13 are respective sealing rings 19, 21. The body of the master cylinder piston 13 is of smaller diameter than the bore 25 and thus defines therewith, and with the two sealing rings 19, 21, an annular chamber 23.

The body 27 of the master cylinder also incorporates a combined generator and pressure modulator device 28 comprising two pistons housed in a second axial bore 29, parallel to the coaxial bores 25, 191, and closed at one end by a transverse wall 31 and at the other end by a plug 33 having a central projection 35 which extends into the interior of the chamber defined by the bore 29, the end wall 31 and the plug 33. The two pistons slidable within the bore 29 comprise a driving piston 39 and a control and distribution piston 43.

The driving piston 39 has an annular groove 45 at an intermediate point along its length, isolated by two annular sealing rings 49, 51 in annular grooves in the periphery of the piston and defining, with the wall of the bore 29 an annular chamber which, for the sake of clarity, will also be indicated with the reference numeral 45. A transverse passage 47 in the wall of the body 27 of the master cylinder permits the annular chamber 45 to communicate with the atmosphere.

The driving piston 39 also has an axial extension 53 directed away from the plug 33 and, in the rest position, contacting the adjacent end of the control and distribution piston 43. This latter has, like the driving piston 39, an annular groove 59 at an intermediate point, and is traversed by a transverse passage 61 which communicates with an axial passage 62 opening into the end face of the control and distribution piston 43 remote from the driving piston 39. This end of the control and distribution piston is formed as an axial projection 63 around which there is a compression spring 65 the other end of which abuts an inwardly projecting annular ridge 66 in the wall of the bore 29. The compression spring 65 urges the two pistons 39 and 43 to the right of FIG. 1 pressing the two pistons against one another and therefore the piston 39 against the projection 35 of the plug 33.

The projection 35 of the plug 33 defines, with the adjacent end wall of the piston 39, an annular chamber 67, and the projection 53 of the piston 39 defines, together with the adjacent end wall of the piston 43 an annular chamber 69. Two passages 71 and 73 communicate respectively with the two annular chambers 67 and 69, the projection 53 of the piston 39 being sufficiently long that the annular chamber 69 is always in communication with the transverse passage 73 even when the piston 39 is displaced by its maximum amount to the left of FIG. 1. A further transverse passage 75 in the wall of the body 27 communicates with the annular chamber 59 in the control and distribution piston 43 when this is in the rest position in which it is shown in FIG. 1. The transverse passage 75 is connected to a brake fluid reservoir 76 via a pipe 77.

The interior of the bore 29 between the end wall 31 and the control and distribution piston 43 is separated into a first chamber 81 and a second chamber 87 by the said inwardly projecting annular ridge 66. The second chamber 87 communicates via a passage 78 in the wall of the body 27 with a volumetric pump 97 via a pipe 95; the volumetric pump 97 is connected to draw brake fluid from the reservoir 76 when in operation. The second chamber 87 also communicates via a radial passage 79 with an axial passage 89 and a ball valve 93 with a radial passage 91 which opens into the first chamber 81.

Located within the first chamber 81 is a valve shutter body 98 which has an axial projection extending into the second chamber 87. Within the first chamber 81 the valve shutter body 98 has an enlarged head 99 which is greater in diameter than that of the inner diameter of the annular ridge 66. The projecting end of the valve shutter body which extends into the second chamber 87 is conical and aligned with the axial passage 62 in the projection 63 of the control and distribution piston 43. The length of the projection of the valve shutter body 98 is such that the cone shaped end enters the mouth of the axial passage 62 in the projection 63 of the control and distribution piston 43 when the enlarged head 99 abuts the annular ridge 66 without, however, closing the axial passage 62. A compression spring 101 between the transverse wall 31 and the valve shutter body 98 urges this to the right of FIG. 1 so that the enlarged head 99 engages the annular ridge 66.

The first chamber 81 between the end wall 31 and the annular ridge 66 communicates, via an axial passage 103, with a transverse passage 105 opening into the wall of the bore 191 adjacent the shoulder between the bore 191 and the coaxial bore 25 of smaller diameter, against which shoulder the larger head 17 of the master cylinder piston 13 abuts in the rest position. The face of the larger head 17 of the master cylinder piston 13 which engages the shoulder between the two coaxial bores 191 and 25 has a rebate 107 milled in it defining, with the passage 105, a small annular chamber which is separated from the remainder of the interior of the bore 191 by an annular sealing ring 21.

The bore 191 is formed within a cylindrical body 193 having a radial flange by means of which it is secured to the body 27 of the master cylinder, the connection being sealed by an annular sealing ring 199.

Slidable within the bore 191 are two pistons 195 and 197 which each have annular grooves, 203 and 205 respectively of a predetermined axial extent. These grooves determine the length of the maximum stroke of the two pistons 195 and 197 by cooperating with respective screws 207, 209 which are screwed into the wall of the body 193 and project into the annular chamber defined by the annular grooves 203 and 205 respectively. The screws 207 and 209 act as abutment stops.

The annular chambers defined by the annular grooves 203 and 205 communicate, through openings in the wall of the body 193 with respective pipes 211, 213 leading to respective brake fluid reservoirs 215, 217: each of the two pistons 195, 197 has an axial extension 231, 233 with a stepped shoulder 225, 226 which locates in position a respective sealing ring 223, 224 which is held in place loosely on the projection to permit fluid to flow past in one direction but not in the other. The annular grooves 203, 205 of the two pistons 195, 197 are separated from their respective projections 231, 233 by respective radial flanges 219, 221. The flanges 219, 221 have axial grooves or millings (not visible in the drawings) which allow the passage of brake fluid between the pistons 195, 197 and the wall of the body 193.

Between the two pistons 195, 197 is a spring 227 which is located in place on the piston 195 by an axial projection 231 which extends towards the piston 197. The other end of the spring 227 engages a washer 235 likewise engaged over an axial projection of the piston 197, which extends towards the piston 195 and holds in place a sealing ring 237. Between the piston 197 and the end wall 239 of the body 193 is another spring 229 which, again, is located in place over an axial projection 233 of the piston 197.

The piston 195 will be referred to hereinafter as the first piston of the master cylinder and the piston 197 will be referred to as the second piston. The two pistons 195, 197 define between them, and the wall of the bore 191 a chamber 241 which communicates, via a pipe 245 with the transverse passage 73 in the wall of the body 27 which leads to the annular chamber 69 between the driving piston 39 and the control and distribution piston 43 thereof. The first chamber 241 is also connected via a brake pipe 247 with the braking circuit 248 of one axle of the vehicle. The second piston 197 defines between itself and the end wall 239 of the bore 191 a second chamber 243 which is connected by a pipe 249 to the transverse passage 71 in the body 27 leading to the annular chamber 67. A further brake pipe 251 connects the second chamber 243 with the braking circuit 255 of the other axle of the vehicle.

The device described above in relation to FIG. 1 operates as follows:

When the brake pedal 3 is depressed the master cylinder piston 13 is urged to the left of FIG. 1 (this will be referred to hereinafter as "forward" movement) thereby causing forward movement of the first piston 195 compressing the fluid in the first chamber 241; this causes forward movement of the second piston 197 compressing the fluid in the second chamber 243. Since the first and second master cylinder chambers 241, 243 are connected to the front and rear braking circuits of the vehicle, compression of the fluid within these chambers causes actuation of the brakes of the vehicle. The increase in fluid pressure in the first and second chambers is also transferred along the pipes 245, 249 to the passages 73, 71 respectively to cause a corresponding increase in the pressure of the chambers 67, 69 thereby urging the two pistons 39, 43 to the left of FIG. 1 towards the valve shutter element 93. Movement of these pistons to the left of FIG. 1 will also be referred to hereinafter as "forward" movement. The piston 43 is displaced towards the conical end of the valve shutter element 98 restricting the mouth of the axial passage 62. When the engine is running so that the pump 97 is operating fluid is pumped from the reservoir 76 along the pipe 95, through the transverse passage 78 in the wall of the body 27 and, passing through the axial passage 62 in the control and distributor piston 43 passes through the transverse passage 61 into the annular chamber 59 and from there through the transverse passage 75 in the body 27 and along the pipe 77 back to the reservoir 76. When the control and distribution piston 43 is displaced to restrict the mouth of the axial opening 62 a pressure rise will take place in the pipe 95 and transverse passage 78 and in the second chamber 87 of the distributor. This increase in pressure is transferred into the passages 79, 89 in the body 27, but the ball valve 93 prevents any further transfer of pressure at this stage. Further movement of the control and distribution piston 43 causes the valve shutter element 98 to be displaced to the left displacing the enlarged end 99 from the annular ridge 66 and permitting fluid under pressure to flow from the second chamber 87 of the distributor into the first chamber 81 thereof.

From the first chamber 81 of the distributor fluid under pressure can flow along the axial passage 103 and the transverse passage 105 to the annular region of the rebate 107 between the enlarged end 17 of the master cylinder piston 13 and the shoulder between the two coaxial bores 25, 191. The extra pressure acting on this face of the enlarged head 17 of the master cylinder piston 13 assists the pressure exerted on the master cylinder piston 13 by the brake pedal 3.

The pressure in the chamber 23 causes further displacement of the first and second pistons 195, 197 thereby increasing the pressure in the first and second master cylinder chambers 241, 243 and increasing the pressure on the braking circuits 248 and 255. The increase in pressure in the first and second master cylinder chambers 241, 243 is transferred to the two chambers 67 and 69. When the pressure in the chamber 23 (which will be the same as the pressure in the first and second chambers 81, 87 of the distributor) is equalised with the pressure in the first and second master cylinder chambers 241, 243 which are the same as the pressures in the chambers 67, 69, the resultant force on the driving piston 39 and the control and distribution piston 43 is the force of the spring 65 which thus displaces these pistons rearwardly, that is to the right of FIG. 1 until a balance position is achieved. Displacement of the control and distribution piston 43 allows the valve shutter 98 also to be displaced by the spring 101 until its enlarged head 99 abuts the annular groove 66 thereby shutting off the chamber 23 from the pump 97. This prevents any vibrations caused by the operation of the pump 97 from being transmitted to the piston 13 and thus back to the brake pedal 3.

When the brake pedal 3 is released, the pressure in the annular chambers 67, 69 falls allowing the pistons 39 and 41 to be displaced by the spring 65 rearwardly, permitting circulation of fluid from the pump 97 back to the reservoir 76 and causing a fall in the pressure in the chamber 87. Pressure in the chambers 23 and 81 can discharge through the unidirectional ball valve 93 into the chamber 87 and from there through the axial passage 62 in the control and distribution piston 43, through the transverse passage 61, the annular chamber 59, the transverse passage 75 and the pipe 77 back to the reservoir 76.

If, due to a fault in the system, there were a fall of pressure in one of the chambers 241 and 243 the pressure in the other chamber ensures that braking will take place at least on the wheels of the axle associated with the other chamber since the two chambers are entirely isolated from one another. Likewise, because of the construction of the system with a driving piston 39 and control and distribution piston 43, even if the pressure is the chamber 67 or the chamber 69 falls, the pressure in the other chamber will be sufficient to displace the control and distribution piston 43 to provide the servo-brake action.

If either of the sealing rings on the piston 39 should fail, this will allow fluid under pressure to flow into the annular chamber 45 and out through the transverse passage 47 giving a physical leak of fluid. This is the only indication of a failure of one of these two sealing rings in normal operation of the device although, obviously, steps must be taken once this failure is noted to rectify the fault since, in the event of a failure in one or other of the braking circuits as indicated above, the continued operation of the servo-brake system depends on the effectiveness of the seals 49 and 51.

Turning now to the embodiment illustrated in FIG. 2, this differs from the first embodiment illustrated in FIG. 1 only in that the chamber 81 is connected by a passage 301 in the end wall 31 and a pipe 305 to the reservoir 76, and in that the chamber 81 houses a second valve shutter element 307 having an enlarged head 309 back-to-back with the valve shutter element 98. The second valve shutter element 307 has a conical end which is aligned with the opening in the passage 301 in the end wall 31 whereby to close this passage when the valve shutter element 307 is displaced to the left (again referred to as "forwardly") of FIG. 2. A biasing spring 311 is compressed between the end wall 31 and the enlarged end 309 of the valve shutter element 307 keeping this pressed against the valve shutter element 98.

The operation of the second embodiment differs from that of the first embodiment only in the action of the second valve shutter 307. This acts in order to release any possible residual pressures which could remain in the chambers 81 and 23 in a case in which the return force of the braking system is not sufficient to discharge all the residual pressure within the device. This could occur, for example, in disc-type braking systems.

When the valve shutter element 98 is displaced forwardly it thrusts the second valve shutter element 307 against the end wall 31 restricting the passage 301. Subsequently, pressure increase in the chamber 81 gives rise to a servo-assisting pressure on the master cylinder piston 13 as in the embodiment of FIG. 1.

When the brake pedal is released the pistons 39 and 43 are allowed to displace to the right of FIG. 2 and the valve shutter element 98, together with the valve shutter element 307 return to the positions illustrated in FIG. 2 opening the passage 301 and allowing any pressure in the chamber 81 to discharge directly along the pipe 305 to the reservoir 76. It will be appreciated, of course, that the dimensions of the various elements must be suitably chosen so that restricting of the passage 301 by the valve shutter element 307 occurs substantially simultaneously with the opening of communication by the valve shutter 98 between the chambers 81 and 87 by displacement away from the annular ridge 66.

In the case of failure the operation of the embodiment of FIG. 2 is substantially the same as that of the embodiment of FIG. 1.

We claim:

1. In a servo assisted braking system for a motor vehicle of the type comprising a master cylinder operatively connected to a brake pedal, a pump for generating fluid pressure, a modulating valve located between the output of said pump and said master cylinder and having means connecting said modulating valve to said master cylinder whereby pressure generated by said pump will be applied as a servo-assisting pressure to said master cylinder, the improvement comprising said modulating valve and said master cylinder being formed as a single assembly comprising a body, two parallel bores in said body, one of said bores housing a main control piston and two subsidiary pistons of said master cylinder, said subsidiary pistons defining with the walls of said bore first and second master cylinder chambers, the other of said bores being closed by an end plug and housing a driving piston and a distributor piston which define with the walls of the other of said bores first and second control chambers, an axial passage in said distributor piston, a transverse passage in said distributor piston communicating with said axial passage, an opening in the side wall of said body adjacent said transverse passage in said distributor piston, means connecting said first control chamber to said first master cylinder chamber, means connecting said second control chamber to said second master cylinder chamber, said distributor piston defining with the walls of said other bore and the adjacent end wall thereof a distributor chamber, an annular inwardly projecting ridge separating said distributor chamber into a first part adjacent said distributor piston and a second part adjacent said end wall, a valve shutter element located in said distributor chamber, said valve shutter element having a head the diameter of which is greater than the inner diameter of said ridge and is located in said second part of said distributor chamber, said valve shutter element further having a stem which extends toward and is co-axial with said axial passage in said distributor piston, an internal passageway in said body connecting said two parts of said distributor chamber and a unidirectional valve located in said passageway to permit flow only from said second part to said first part of said distributor chamber.

2. In a servo assisted braking system as set forth in claim 1, wherein said stem of said valve shutter element is located in said first part of said distributor chamber and further comprising pipe means connecting said first part of said distributor chamber to the output of said pump.

3. In a servo assisted braking system as set forth in claim 1, further comprising resilient biasing means for biasing said valve shutter element into contact with said annular ridge.

4. In a servo assisted braking system as set forth in claim 1, further comprising an opening in said end wall of said distributor chamber, pipe means connecting said opening directly to a brake fluid reservoir and an additional valve shutter element disposed in said second part of said distributor chamber between said first mentioned valve shutter element and said end wall, said additional valve shutter element having a projection with a conical end which extends towards said opening in said end wall and restricts said opening when displaced into contact with said opening by displacement of said additional valve shutter element by said first mentioned valve shutter element.

5. In a servo assisted braking system as set forth in claim 4, further comprising resilient biasing means for biasing said additional valve shutter element away from said opening in said end wall.

* * * * *